United States Patent [19]

Johnson

[11] 3,838,704
[45] Oct. 1, 1974

[54] METHOD OF ASSEMBLING AN AXIAL FLOW VALVE

[76] Inventor: Dwight N. Johnson, 325 N. Bel Air, Anaheim, Calif. 92801

[22] Filed: Jan. 22, 1973

[21] Appl. No.: 325,373

Related U.S. Application Data

[60] Division of Ser. No. 194,188, Nov. 1, 1971, which is a continuation of Ser. No. 867,195, Oct. 17, 1969, abandoned.

[52] U.S. Cl. ................................... 137/15, 251/5
[51] Int. Cl. ........................................... F16k 7/07
[58] Field of Search ......... 251/5, 61.1; 137/15, 515, 137/515.7, 525

[56] References Cited
UNITED STATES PATENTS

| | | | |
|---|---|---|---|
| 994,167 | 6/1911 | Koppitz | 137/492 |
| 3,143,124 | 8/1964 | Todd | 251/5 X |
| 3,145,967 | 8/1964 | Gardner | 251/5 |
| 3,371,677 | 3/1968 | Connolly | 251/5 X |
| 3,467,131 | 9/1969 | Ratelband | 251/5 X |

FOREIGN PATENTS OR APPLICATIONS

| | | | |
|---|---|---|---|
| 81,273 | 11/1950 | Czechoslovakia | 251/61.1 |
| 727,366 | 3/1955 | Great Britain | 251/61.1 |
| 986,047 | 3/1949 | France | 251/5 |

*Primary Examiner*—William R. Cline
*Assistant Examiner*—Richard Gerard
*Attorney, Agent, or Firm*—Lyon & Lyon

[57] ABSTRACT

There is disclosed herein a method of assembling a throttling valve of the axial flow type for controlling fluid flow. The valve includes an expandable sleeve of resilient material having a toroidal configuration and positioned within a housing on a cage member. When the sleeve is in a rest position there is no fluid flow, but the sleeve can expand as a result of differential pressure acting thereon to allow flow in varying degrees between the sleeve and cage.

3 Claims, 7 Drawing Figures

METHOD OF ASSEMBLING AN AXIAL FLOW VALVE

This is a division of the application Ser. No. 194,188, filed Nov. 1, 1971, which is a continuation of Ser. No. 867,195, filed Oct. 17, 1969, and now abandoned.

This invention relates to a throttling valve and more particularly to an expandable sleeve axial flow valve.

Conventional fluid valves employ an actuating element usually in the form of a diaphragm which responds to pressure differentials for controlling some type of throttle mechanism, usually in the form of a valve member and orifice. Valves of the axial flow type have been devised and generally include a cage member surrounded by a cylindrical resilient sleeve. More particularly, a circular slotted cage with a barrier in the center thereof is encircled by an expansible rubber sleeve. The annular chamber between an outer body or housing allows the sleeve to expand, permitting fluid flow through the slotted cage and past the center barrier. Valve closure is obtained by introducing pressure equal to the input pressure into the annular chamber at the outer periphery of the sleeve. This action maintains the sleeve in contact with the cage thereby preventing fluid flow through the valve. An arrangement of this general nature is illustrated in U. S. Pat. No. 2,622,619.

Prior expansible sleeve valves have been characterized by several drawbacks. Stability thereof generally is poor at low fluid flows through the valve. The fluid stream usually impinges substantially upon the sleeve and deflects the fluid stream thereby subjecting the sleeve to erosion. The usual sleeve requires special vacuum expanding equipment for removal of the sleeve from the cage. Other difficulties known to those in the art are encountered in the assembly, operation and use of such prior valves.

Accordingly, it is a principal object of this invention to provide an improved valve of the axial flow, expansible sleeve, type.

It is an object of this invention to provide an axial flow valve employing an expansible sleeve of novel configuration.

It is a further object of this invention to provide an axial flow valve employing an expansible sleeve and which is characterized by improved operation.

These and other objects and features of the present invention will become better understood through a consideration of the following description taken in conjunction with the drawings in which.

Figure 1:
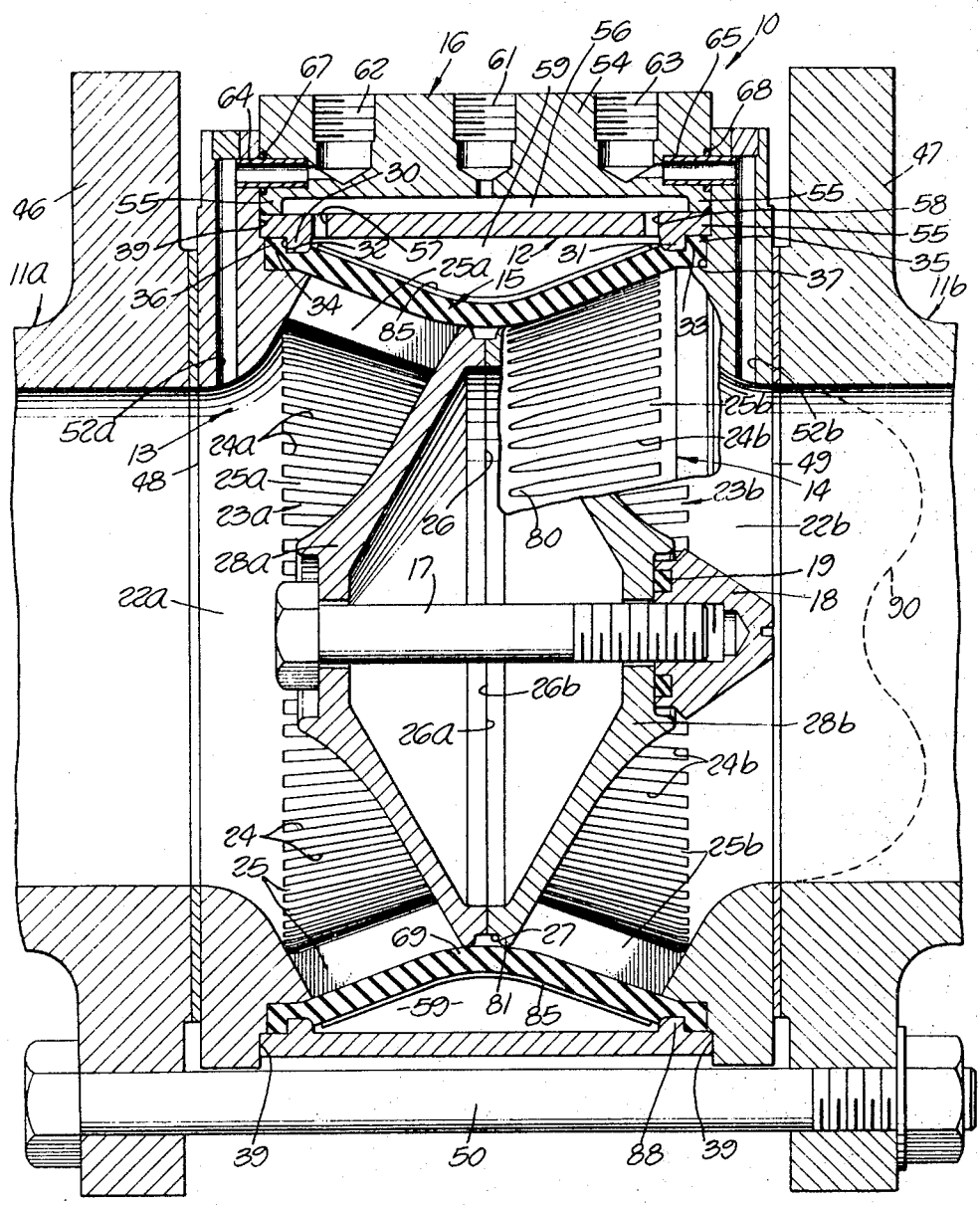
FIG. 1 is a cross-sectional elevational view of a valve constructed in accordance with the teachings of the present invention.

Turning now to the drawings, FIG. 1 illustrates the valve 10 interposed within a fluid line 11a-11b. THe valve 10 includes an outer cylindrical body 12, a pair of substantially identical slotted cages 13 and 14, and a resilient expansible sleeve 15 positioned around the cages 13 and 14. A manifold 16 is welded to the outer periphery of the body 12 for purposes which will be explained in greater detail subsequently. The cages 13 and 14 are secured together by means of a bolt 17 and fairing nut 18. A downstream seal is provided by an O-ring 19.

Considering the construction of the valve in more detail, each of the cages 13 and 14 is substantially identical and hence only one will be described in detail. The cages include an annular throat portion 22, which is an inlet throat 22a in the case of the cage 13 and an outlet 22b in the case of the cage 14. The throat flares outwardly to a truncated cone portion 23 which is in the form of a plurality of elongated slots 24 and ribs 25. The slots extend entirely through the wall of the truncated cone portion 23 of the cage. The portion 23 terminates in a face 26, and faces 26a and 26b of the cages 13 and 14 are abutted as shown in FIG. 1. The cages are undercut at the edges of the faces 26 thereby forming an annular groove 27 when the cages are abutted as shown. This construction compensates for variations in manufacture which results in slight eccentricities. Extending backwardly from the face 26 is a solid barrier portion 28 in the form of a cone through which the bolt 17 extends to secure the cages 13 and 14 together to effectively form one cage unit. Each cage thus is similar to a bowl having a raised center and a slotted wall.

Figure 3:
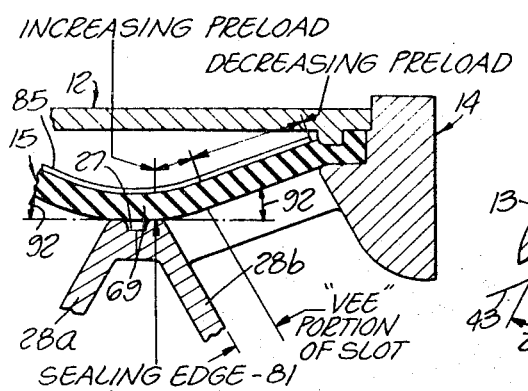
FIGS. 3 through 5 are fragmentary diagramatic cross-sectional views illustrating operational characteristics of the sleeve of the present valve, and respectively show the valve closed, throttling and open.
Figure 4:
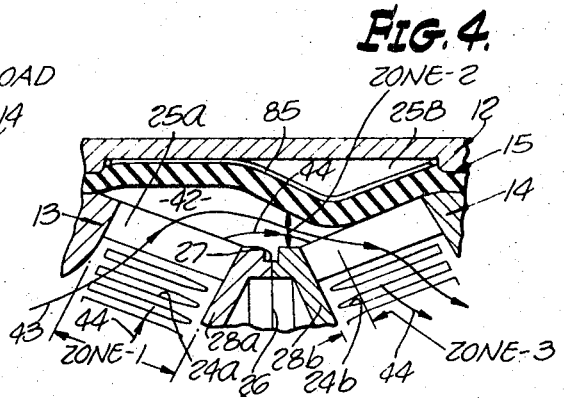
Figure 5:
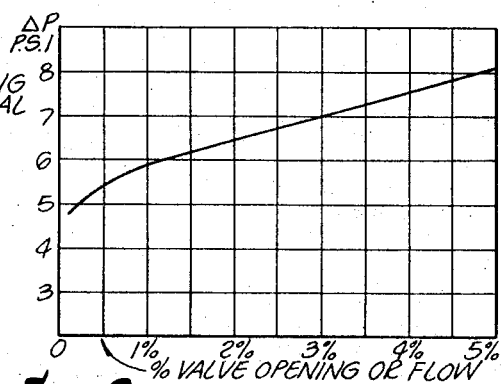

The body 12 includes internal edge rims 30 and 31 forming respective shoulders 32 and 33. The ends of the sleeve 15 include flanges 34 and 35 which are sandwiched between the shoulders 32 and 33 and respective L-shaped surfaces 36 and 37 at the periphery of the annular throat portions of the respective cages 13 and 14. The cages include a flange 39 which abut the outer circular faces of the body 12 as seen in FIG. 1. In this manner, the cages 13 and 14, body 12 and sleeve 15 are secured together as a rigid unit by the bolt 17 and nut 18. It will be apparent that fluid flow into the inlet throat 22a of the cage 13 cannot flow to the outlet throat 22b with the sleeve 15 in the position shown in FIGS. 1-3 because the inner surface of the sleeve 15 seals all of the grooves 24. Turning briefly for the moment to FIGS. 4 and 5, which will be explained in greater detail subsequently, it can be seen that as the sleeve 15 expands radially outward because of a higher pressure on the inside thereof than on the periphery thereof, fluid can flow from the inlet throat 22a through grooves 24a past the cage ribs 25a and through the annular space or cavity 42 formed between the inner surface of the sleeve and outside of the cages as the sleeve expands. The fluid then flows through the grooves 24b and past the ribs 25b to the outlet throat 22b and thus into the downstream fluid line 11b as indicated by arrows 43 and 44.

The valve 10 is sandwiched between pipe flanges 46 and 47 of the respective fluid lines 11a and 11b. Seals are provided by gaskets 48 and 49. A plurality of bolts, such as a bolt 50, extend through the flanges 46 and 47 at several locations around the periphery of the valve to secure together the flanges and the valve. This arrangement of the valve between the flanges produces only compressive stress on the valve.

The cages 13 and 14 include passages 52a and 52b, respectively, which communicate between the respective throat sections and the manifold 16. The manifold 16 is in the form of a block 54 having a skirt 55 around the bottom thereof. The skirt mates with the outer surface of the body 12 and is welded all around the skirt to secure the manifold to the body and to provide a sealed chamber 56. The chamber 56 communicates through passages 57 and 58 with an annular control chamber 59 defined by the outer periphery of the sleeve 15 and inner wall of the body 12. The manifold 16 includes a port 61 which communicates with the chamber 56, and ports 62 and 63 which respectively communicate through hollow roll pins 64 and 65 with the passages 52a and 52b, respectively. Seals are provided about the roll pins 64 and 65 by respective O-rings 67 and 68. The roll pins serve to align the passages 52a and 52b with the manifold 16 and to provide the noted communication with the respective ports 62 and 63.

From the foregoing, it will be apparent that the port 62 communicates with the inlet throat 22a of the valve through the passage 52a and roll pin 64. The port 63 communicates with the outlet throat 22b through the passageway 52b and the roll pin 65. It should be noted that the construction of the present valve is symmetrical and either end thereof may be used as the upstream end.

The sleeve 15 may be molded of a suitable resilient material such as rubber, and is molded to a diameter smaller than the periphery of the cages 13 and 14 which it surrounds. Molded in this manner, the sleeve is preloaded and is normally closed, and a sleeve expanding differential pressure thus is necessary to open the valve. External control of the sleeve expanding differential causes the valve to regulate pressure, or flow, as the particular application thereof dictates. The sleeve is essentially toroidal and flares outwardly from the central, smaller diameter, portion 69 toward both ends thereof. The thickness of the sleeve may vary from the center outward, but the sleeve preferably is of uniform thickness to prevent localized distortion thereof and to allow the valve to operate over a wide temperature range.

Figure 2:
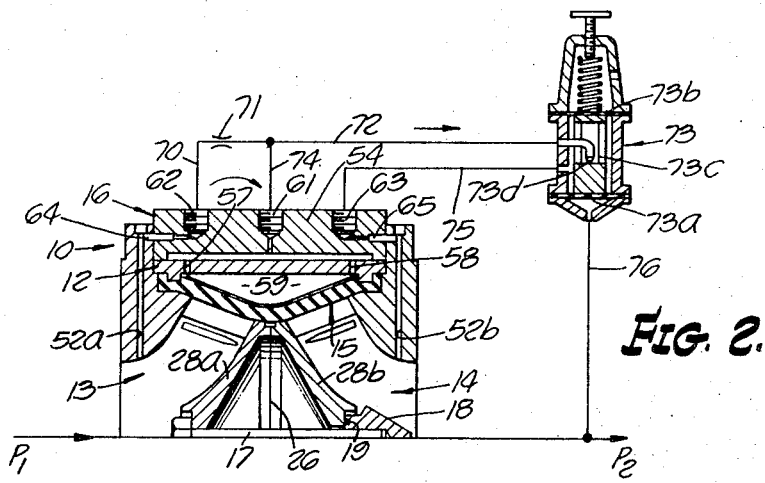
FIG. 2 is a fragmentary diagramatic cross-sectional view and flow diagram of the present valve as utilized for pressure control.

A typical external control circuit for pressure regulation is illustrated in FIG. 2. Here, the port 62 is connected through a line 70, a restrictor 71 and a line 72 to the orifice of a conventional pilot regulator 73. THis pilot regulator may be a type "Z-SC," Model 100 regulator, manufactured and sold by the American Meter Company of Fullerton, California. The port 61 is coupled through a line 74 to the line 72, and the port 63 is coupled through a line 75 to the interior chamber of the regulator 73. As is well known, the regulator 73 includes diaphragms 73a and 73b coupled by a yoke 73c. Pressure from the line 75 is applied between the diaphragms, pressure from the line 72 is applied at an orifice 73d, and output pressure $P_2$ is applied to the underside of the diaphragm 73a by a line 76.

In operation, upstream pressure $P_1$ flows through the passageway 52a to the port 62, and through the restrictor 71 and line 74 back to the port 61 and chamber 59. The pressure in the line 72 is applied to the inlet of the pilot regulator 73. Downstream pressure $P_2$ is supplied by the line 76 to the pilot regulator. If the downstream pressure $P_2$ satisfies the set point of the pilot regulator 73, the pressure in the annular chamber 59 will equal the upstream pressure $P_1$ and the valve will be closed with the sleeve 15 positioned on the cage unit 13–14 as seen in FIGS. 1 through 3. As the downstream pressure $P_2$ lowers, the pilot regulator 73 will progressively open the orifice 73d and cause a pressure drop across the restrictor 71 proportional to the degree of pilot opening. It will be apparent that reduced pressure in line 72 causes a reduction in pressure in the control chamber 59. The sleeve expanding differential pressure across the sleeve 15 is therefore proportional to the reduction in downstream pressure from the set point of the pilot regulator 73.

Figure 6:
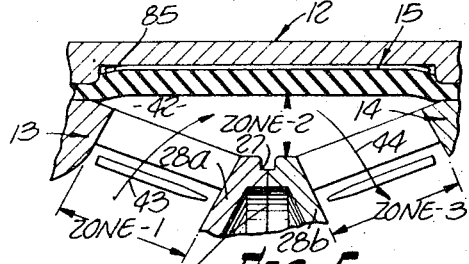
FIG. 6 is a graph illustrating operational characteristics of the present valve.

It is well known that a proportional relationship between downstream pressure change and degree of valve opening contributes greatly to regulator stability. This proportional relationship is known as "droop" or "offset" when seen on a regulator capacity curve. Regulator stability becomes difficult to achieve at low flows when the valve opening is comparatively small. The graph of FIG. 6 shows the relationship of valve opening to sleeve expanding differential afforded by the present valve. It should be noted that the delta pressure change required for a given increment of valve opening is greater at valve openings below one percent. The resultant "droop" or "offset" would be most pronounced in the first increment of flow, which is the region where regulator instability is most likely to occur. The curve in FIG. 6 is accomplished in the present valve by valve differential pressure loading the sleeve against the "vee" portion 80 of the slots 24a-24b (note FIG. 3). This portion is a region of increasing preload, and the differential pressure across the sleeve makes it increasingly more difficult to lift the sleeve off the cage as the slots increase in width. The resultant valve action can be likened to peeling a newspaper off the grillwork of a sink drain. The section of the sleeve upstream of the sealing edge 81 serves to pull the small diameter portion 69 (FIG. 3) of the sleeve away from the sealing edge at differentials below that required to expand the small diameter sleeve portion as seen in FIG. 4. The slight increase in sleeve preload resulting from the "vee" portion 80 of the slots provides the "peeling off" valve action noted above. A gradual transition in the valve action occurs with increased valve opening. The sleeve expanding differential at the smallest diameter portion 69 of the sleeve 15 becomes the dominant factor in the degree of valve opening as the upstream section of the sleeve expands against the interior wall of the body 12. For a given differential, the smaller diameter portion 69 of the sleeve expands to provide an annular flow area 42. The decay in sleeve expanding differential as the gas flows from the above annular flow area into the cage determines the slope and contact point of the downstream portion of the sleeve. Referring to FIG. 4, zone 2 is the dominant annular flow area and zone 3 is the resultant flow area.

The final transition in valve action starts when the small diameter portion 69 of the sleeve expands to the point of contacting the inside surface of the body 12. At this point of sleeve expansion, the sleeve still slopes conically relative to the cage, since pressure decay still occurs as the gas flow feeds into the downstream slots 24b. A substantial sleeve expanding differential relative to inlet pressure needs to be generated to fully expand the sleeve 15 to the position shown in FIG. 5 because pressure drops occur across both zone 1 and zone 2 as seen in FIG. 5. The passage 52b is an aspirator passage which becomes active at higher flows and thus provides an artificially low downstream pressure for the purpose of achieving full sleeve expansion with low differential pressure across the valve.

Figure 7:
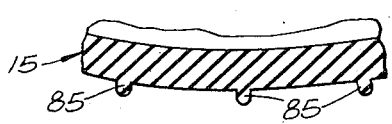
FIG. 7 is a fragmentary cross-sectional view of the sleeve.

A plurality of ribs 85 as seen in FIGS. 1 and 7 are provided on the periphery of the sleeve 15. As the sleeve 15 expands, the outer edges (the edges near the flanges 34 and 35) contact the interior surface of the body 12 first because of the greater diameter of the sleeve at the edges than at the middle of the sleeve. As these edges of the sleeve expand, the ribs 85 provide an escape route for fluid within the annular control chamber 59 so that this fluid can still escape through the passages 57 and 58 to allow the middle portion of the sleeve to expand, ultimately to the position shown in FIG. 5. An exemplary regulator has a length of approximately 4½ inches and a body diameter of approximately 6⅞ inches. The sleeve has an outer diameter at 88 of approximately 6⅝ inches and an outer diameter at the central portion 69 thereof of slightly under 5 inches, and an upstream-to-downstream length of approximately 3½ inches. The ribs are spaced approximately ½ inch apart on this sleeve, and the thickness of this sleeve is .0002 inch thick. The angle 92 (FIG. 3) of the cages may be approximately twenty degrees, and the similar angle of the sleeve is slightly greater, such as 30°. The edge rims 30 and 31 of the body 12 serve to introduce a predetermined rate of sleeve expansion to aid in eliminating outward popping of the sleeve. These rims thus eliminate excess flexing and premature failure of the sleeve. The slots 24a-24b are tapered at the end 80. They taper from almost a point at 80 to essentially parallel sides. The tapered slot construction allows a more compact device with the wider end of the slots giving a greater flow area; otherwise, the slots, and thus the cages, would need to be conger to provide sufficient flow area. The thickness of the ribs 25 and the width of the slots 24 are approximately the same.

The particular truncated cone configuration of the cage 13 and 14, and particularly the outlet cage 14 provides an improved fluid flow pattern indicated by dotted line 90 in FIG. 1 into the downstream pipe 11b. The velocity profile 90 at the entrance of the downstream pipe 11b closely approximates the final velocity profile further downstream in the pipe. This velocity profile matching is achieved with a minimum amount of impingement or deflection of the gas stream, and the matching or minimum gas impingement, contribute both to high pressure recovery and low noise, and also to less pipe abrasion.

During the first increment of valve opening in conventional expansible sleeve valves, throttling action is initiated with an area, similar to that identified as zone 2 in FIG. 5, being the dominant, or controlling factor in valve opening. This action results in poor stability at low flows, and is not the case with the present invention as has been explained above.

The cone shaped cage and the toroidal sleeve provide a flow path configuration by which the sleeve does not fully or significantly deflect gas flow when the valve is open, as contrasted with prior devices in which the sleeve expands to a configuration which causes a large amount of flow to be deflected by the sleeve resulting in errosion of the sleeve. Prior substantially cylindrical sleeves, which are molded to a diameter smaller than a cylindrical cage, require special vacuum expanding equipment for removal of the sleeve from the cage; whereas, the two piece cage construction of the present valve enable ready disassembly and reassembly by one person using conventional tools. The present valve is symmetrical except for the fairing nut 18, and can throttle flow in either direction. The resulting advantages include double the wear life, use of common parts and bi-directional control of flow.

Additionally, the toroidal configuration of the sleeve 15 permits the sleeve material to contract longitudinally while being expanded circumferentially. With a cylindrical sleeve the same stretches essentially like a barrel. The dimensional advantages of the present sleeve closely follow the natural behavior of a stretched cylindrical rubber part and thus includes lower stress levels for a given annular opening 44. Low stress levels in the sleeve provide for longer sleeve life and more positive valve closure.

The relatively small size and light weight of the present valve permits economical use of close tolerances investment castings for the cages 13 and 14. The improved detail available with the investment casting process permits the design of narrow slots 24 with zero draft which in turn permits the use of a relatively thin sleeve 15. The investment casting process also allows the cages 13 and 14 to be made from a large variety of materials.

The present embodiment of this invention is to be considered in all respects as illustrative and not restrictive.

What is claimed is:

1. A method of assembly an axial flow type valve adapted to be mounted between pipe flanges or the like comprising
    inserting flexible tapered sleeve means within housing means and defining a control chamber between the outer surface of said sleeve means and the inner surface of said housing means, and
    inserting a pair of hollow cage means into respective opposite ends of said sleeve means and axially confining said sleeve means between said cage means and sandwiching the ends of said sleeve means between said housing means and the ends of respective cage means, each of said cage means having a plurality of flow passages therethrough and the cage means having an intermediate barrier for preventing direct axial flow through said valve, said sleeve means being preloaded for normally sealing said flow passages through said cage means and providing a valving action with respect to said flow passages,
and
    maintaining said cage means in said sleeve means.

2. A method as in claim 1 wherein
    said cage means are maintained in said sleeve means by bolting together an intermediate barrier portion of each said cage means.

3. A method as in claim 2 including
    providing a conical fairing at the intermediate barrier of said cage means in the downstream flow direction of said valve.

* * * * *

UNITED STATES PATENT OFFICE
CERTIFICATE OF CORRECTION

Patent No. 3,838,704                     Dated October 1, 1974

Inventor(s) Dwight N. Johnson

It is certified that error appears in the above-identified patent and that said Letters Patent are hereby corrected as shown below:

On the cover page of the patent add:

--[73] Assignee:  The Singer Company                                    --

Signed and sealed this 31st day of December 1974.

(SEAL)
Attest:

McCOY M. GIBSON JR.                C. MARSHALL DANN
Attesting Officer                  Commissioner of Patents